(12) United States Patent
Tseng (10) Patent No.: US 12,436,341 B2
(45) Date of Patent: Oct. 7, 2025

(54) LATCH STRUCTURE AND OPTICAL RECEPTACLE THEREOF

(71) Applicant: Chung-Ming Tseng, Myau-Li County (TW)

(72) Inventor: Chung-Ming Tseng, Myau-Li County (TW)

(73) Assignee: ACSUPER TECHNOLOGIES INC., Myau-Li County (TW)

( * ) Notice: Subject to any disclaimer, the term of this patent is extended or adjusted under 35 U.S.C. 154(b) by 70 days.

(21) Appl. No.: 17/401,319

(22) Filed: Aug. 13, 2021

(65) Prior Publication Data

US 2022/0137305 A1 May 5, 2022

Related U.S. Application Data

(60) Provisional application No. 63/108,896, filed on Nov. 3, 2020.

(51) Int. Cl.
*G02B 6/38* (2006.01)

(52) U.S. Cl.
CPC ......... *G02B 6/3831* (2013.01); *G02B 6/3825* (2013.01)

(58) Field of Classification Search
CPC ............................. G02B 6/3831; G02B 6/3825
USPC .......................................................... 385/134
See application file for complete search history.

(56) References Cited

U.S. PATENT DOCUMENTS

| 10,852,490 B2* | 12/2020 | Chang | G02B 6/3825 |
| 11,630,279 B2* | 4/2023 | Lu | G02B 6/44526 |
| | | | 385/99 |
| 11,733,465 B2* | 8/2023 | Newbury | G02B 6/3878 |
| | | | 385/139 |
| 2014/0241689 A1* | 8/2014 | Bradley | G02B 6/3897 |
| | | | 385/135 |
| 2021/0263245 A1* | 8/2021 | Liu | G02B 6/3897 |

* cited by examiner

*Primary Examiner* — Michael G Lee (57) ABSTRACT

The present invention provides a latch structure assembled inside an optical receptacle having a first assembly structure arranged therein. The latch structure comprises a supporting element having a first side and a second side, a first coupling structure and a second assembly structure. The first coupling structure is arranged on a second side of the supporting element, and has a first alignment element. The second assembly structure is arranged on the supporting element and is extended toward the first side. The second assembly structure is assembled with the first assembly structure so as to form a second coupling structure. In addition to being dismantled, the latch structure may have specific color, texts, or a first alignment element having specific shape or arranged position that may be identified by the user so that a corresponding optical connector may be coupled therewith.

8 Claims, 7 Drawing Sheets

LATCH STRUCTURE AND OPTICAL RECEPTACLE THEREOF

CROSS-REFERENCE TO RELATED APPLICATION

This application claims the benefit under 35 U.S.C. § 119(e) to the U.S. provisional patent application having the Ser. No. 63/108,896 filed on Nov. 3, 2020, the entirety of which is incorporated herein by reference.

FIELD OF INVENTION

The present invention relates to a latch structure. In particular, it relates to a latch structure that is detachable and has identification features to be coupled to a specific optical connector and optical receptacle thereof.

BACKGROUND OF THE INVENTION

Due to the advantages of high frequency bandwidth and low loss, optical fibers have been widely used as signal transmission media in recent years. The use of optical fiber has already had a major revolutionary impact in the communications industry. Nowadays, 100G optical module communication is not enough, and the future will be expected to move towards the era of 400G optical module communications.

In the field of 400G optical communications, there are also many designs for the packaging design of optical fiber modules, one of which is called Quad Small Form Factor Pluggable-Double Density (QSFF-DD). The specification, with a downward compatible design, has attracted the attention of many large manufacturers, and has launched corresponding specifications of optical communication module products.

The optical fiber would be used as a signal transmission medium through the optical connector, and the optical connector is inserted into the optical receptacle to transmit the signal to the destination. With the vigorous development of network transmission and applications, the higher the density of the optical receptacle in the unit space, the space utilization is better. In some scenarios, for the sake of information protection, or for the convenience of computer room managers to effectively control the network hardware configuration and network resource allocation, there would be a need to limit specific optical connectors to be inserted. In a specific optical receptacle, this can simplify the complexity of management and maintain the security of information transmission.

In order to solve the above-mentioned needs, in conventional technologies, alignment features, such as visually recognizable colors, text, or alignment structure, are used to limit a specific connector to be inserted into the corresponding optical receptacle. Although the optical connector has the alignment feature, the alignment feature of the conventional technology is integrally formed on the optical receptacle, after producing, the user cannot change it, which would cause inconvenience in use and management.

Based on the above requirements, there is a need for a paired optical connector and receptacle that can help users to identify, so that the user can quickly connect those two together, and also need a way that can be configured according to the user. The need to adjust or change the matching position would not be limited to the inherent settings of the optical connector and optical receptacle.

The above information disclosed in this section is only for enhancement of understanding of the background of the described technology and therefore it may contain information that does not form the prior art that is already known to a person of ordinary skill in the art.

SUMMARY OF THE INVENTION

The present invention provides a latch structure and an optical receptacle thereof, which have visually recognizable features, such as alignment structure, color or text. After the latch structure is installed in the optical receptacle, the user can distinguish the characteristics of the optical receptacle through visual recognition, and then select the corresponding optical connector to insert into the corresponding optical receptacle.

The present invention provides a latch structure and an optical receptacle thereof. The latch structure has the feature of being detachable. Therefore, users can select or change the latch structure according to their needs. This can solve the problem that the user or manufacturer must know the order of the alignment features that cannot be changed in the conventional technology. The present invention provides each specific optical connector correctly inserted into the corresponding optical receptacle, so as to achieve use convenience and effective management.

In one embodiment, the present invention provides a latch structure, disposed in an optical receptacle, a first assembly structure disposed in the optical receptacle, comprising: a supporting element, having a first side and second side; a first coupling structure, located on the second side of the supporting element, and having a first alignment structure; and a second assembly structure, disposed on the supporting element and extended toward the first side, the second assembly structure combined with the first assembly structure to form a second coupling structure, and the second assembly structure having a second alignment structure.

In another embodiment, the present invention also provides an optical receptacle, comprising: a housing, both sides of the housing having a first insertion hole and a second insertion hole, an accommodation space is disposed in the housing, and the housing having at least one first assembly structure; and at least one latch structure, disposed in an optical receptacle, the each latch structure comprising: a supporting element; a first coupling structure, extended toward the second insertion hole from the supporting element, and the first coupling structure having a first alignment structure and configured for coupling to a first optical connector inserted through the second insertion hole; and a second assembly structure, disposed on the supporting element and extended toward the first insertion hole, the second assembly structure having a second alignment structure, and the second assembly structure combined with the first assembly structure to form a second coupling structure, which is configured for coupling to a second optical connector inserted through the first insertion hole.

Many of the attendant features and advantages of the present invention will become better understood with reference to the following detailed description considered in connection with the accompanying drawings.

BRIEF DESCRIPTION OF THE DRAWINGS

The detailed structure, operating principle and effects of the present invention will now be described in more details hereinafter with reference to the accompanying drawings that show various embodiments of the present invention as follows.

DETAILED DESCRIPTION OF THE PREFERRED EMBODIMENTS

Reference will now be made in detail to the exemplary embodiments of the present invention, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this invention will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way.

For convenience, certain terms employed in the specification, examples and appended claims are collected here. Unless defined otherwise, all technical and scientific terms used herein have the same meaning as commonly understood by one of the ordinary skill in the art to which this invention belongs.

Various embodiments will now be described more fully with reference to the accompanying drawings, in which illustrative embodiments are shown. The inventive concept, however, may be embodied in various different forms, and should not be construed as being limited only to the illustrated embodiments. Rather, these embodiments are provided as examples, to convey the inventive concept to one skilled in the art. Accordingly, known processes, elements, and techniques are not described with respect to some of the embodiments.

The singular forms "a", "and", and "the" are used herein to include plural referents unless the context clearly dictates otherwise.

The following descriptions are provided to elucidate a latch structure and optical receptacle thereof and to aid it of skilled in the art in practicing this invention. These embodiments are merely exemplary embodiments and in no way to be considered to limit the scope of the invention in any manner.

Figure 1A:
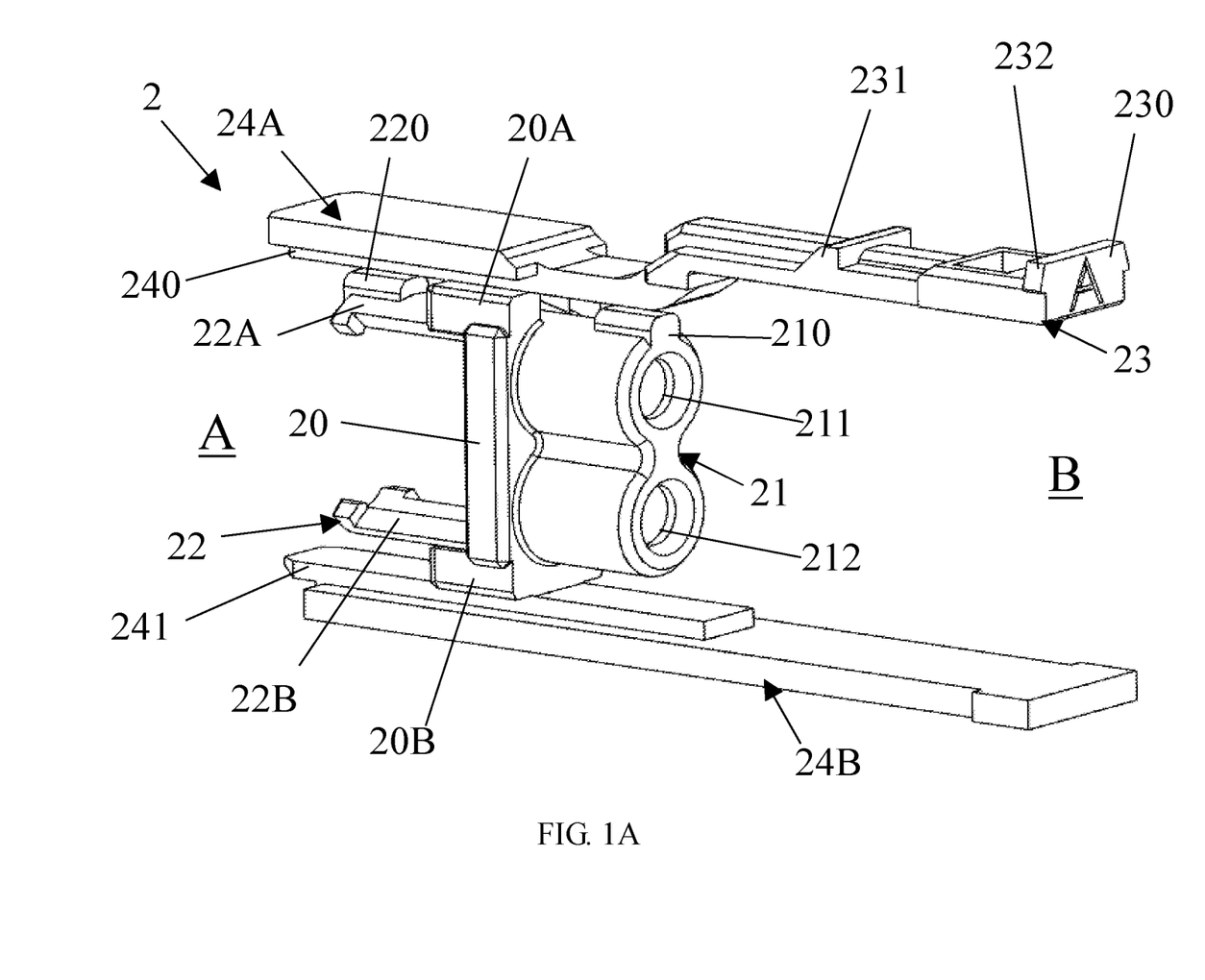
FIG. 1A and FIG. 1B are respectively three-dimensional schematic diagrams of different viewing angle embodiments of the latch structure in the present invention.
Figure 1B:
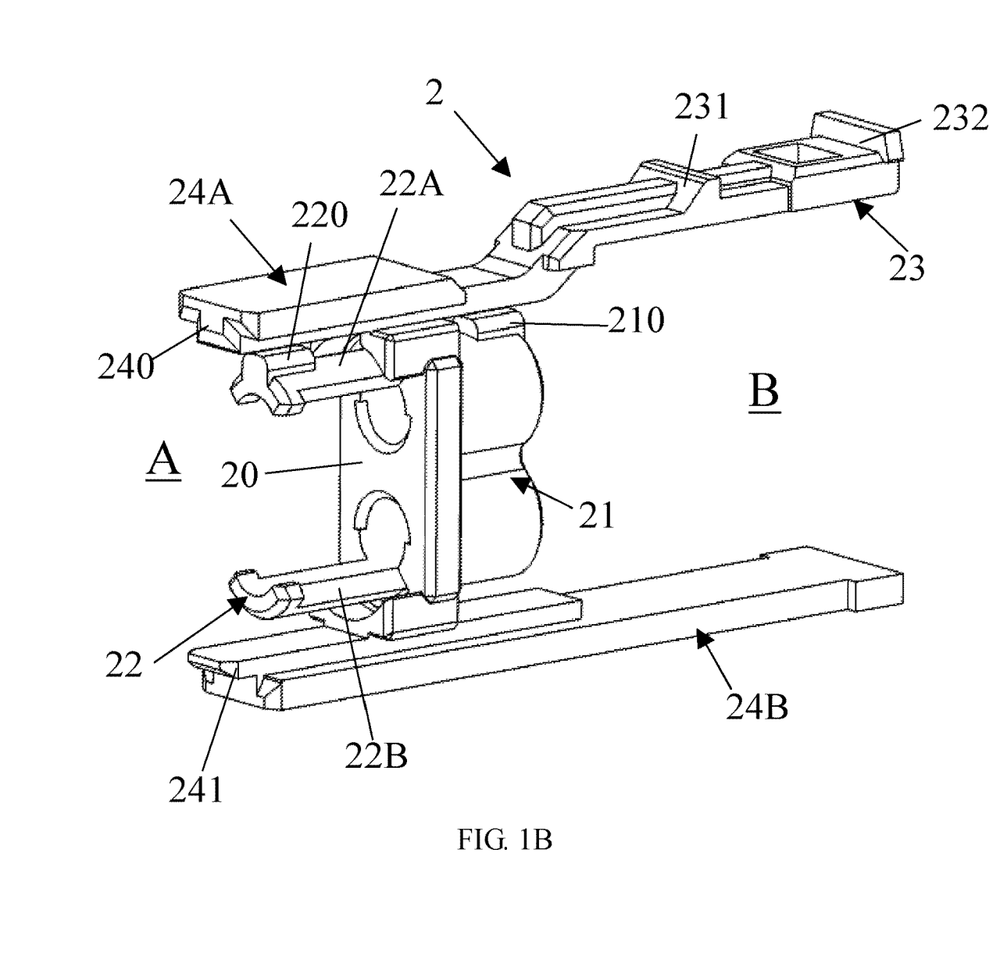

Please refer to FIGS. 1A and 1B, which are respectively three-dimensional schematic diagrams of different viewing angle embodiments of the latch structure in the present invention. In this embodiment, the latch structure 2 includes a supporting element 20, a first coupling structure 21 and a second assembly structure 22. The supporting element 20 has a first side A and a second side B. The first coupling structure 21 is located on the second side B of the supporting element 20, and the first coupling structure 21 has a first alignment structure 210, the shape of which may be determined according to requirements, and is not limited thereto. The first coupling structure 21 has a first coupling hole 211 and a second coupling hole 212 for coupling with the optical connector. It should be noted that in this embodiment, the first alignment structure 210 is disposed on the wall of the first coupling hole 211, but it is not limited thereto, and may also be disposed on the wall of the second coupling hole 212. Alternatively, there is a first alignment structure 210 disposed on both the wall of the first coupling hole 211 and the second coupling hole 212.

The second assembly structure 22 is disposed on the supporting element 20 and extends toward the first side A. The second assembly structure 22 is used to combine with the first assembly structure (not shown) in the optical receptacle, and the detailed description would be described later. In this embodiment, the second assembly structure 22 has a first assembly member 22A and a second assembly member 22B, which are respectively disposed at the two end portions 20A and 20B of the supporting element 20. In this embodiment, two end portions 20A and 20B are located at the upper end and lower end of the supporting element 20. A second alignment structure 220 is disposed on one of the first assembly members 22A. It should be noted that the second alignment structure 220 does not have to be disposed on the first assembly member 22A. In another embodiment, it may also be disposed on the second assembly member 22B or on both the first assembly member 22A and the second assembly member 22B.

Figure 1C:
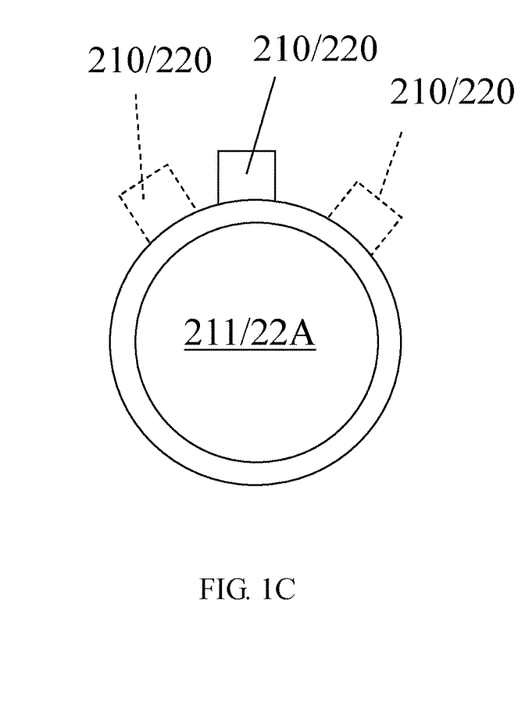
FIG. 1C is a schematic front view of the position relationship between the first coupling hole and the first alignment structure or between the first assembly member and the second alignment structure in the present invention.

In addition, it should be noted that the positions of the first alignment structure 210 and the second alignment structure 220 are not limited to the position shown in FIGS. 1A and 1B. For example, as shown in FIG. 1C, which is a schematic front view of the position relationship between the first coupling hole 211 and the first alignment structure 210 or between the first assembly member 22A and the second alignment structure 220. In the FIG. 1C, the solid line represents the current position of the first alignment structure 210 shown in FIG. 1A or the second alignment structure 220 shown in FIG. 1B, and the dashed line represents other possible position of first alignment structures 210 and second alignment structures 220. Each position represents that only the optical connector matched with the position may be inserted. It should be noted that, although the first alignment structure 210 in this embodiment is a convex structure, in another embodiment, it may also be a concave structure, which is determined according to the user's needs and not limited thereto.

In this embodiment, as shown in FIG. 1A, an extending arm 23 is extended from one end portion 20A of the supporting element 20 toward the second side B, and the extending arm 23 has identification features. In an embodiment, the identification feature may be a color, for example, the supporting arm 23 has a specific color, or there is an identifiable color on a specific area of the supporting arm 23. In another embodiment, an identification structure 230 may be a text or a specific pattern. The extending arm 23 further has a first fastener 231, and an end of the extending arm 23 has a second fastener 232, and an end surface of the extending arm 23 has an identification structure 230. Located on the opposite side of the extending arm 23, there is a first guiding plate 24A extended toward the first side A, and at the end portion 20B of the supporting element 20, there is a second guiding plate 24B extended toward both the first side A and the second side B. The first guiding plate 24A has a first guiding body 240, and the second guiding plate 24B has a second guiding body 241, the function of which would be described later.

Figure 2A:
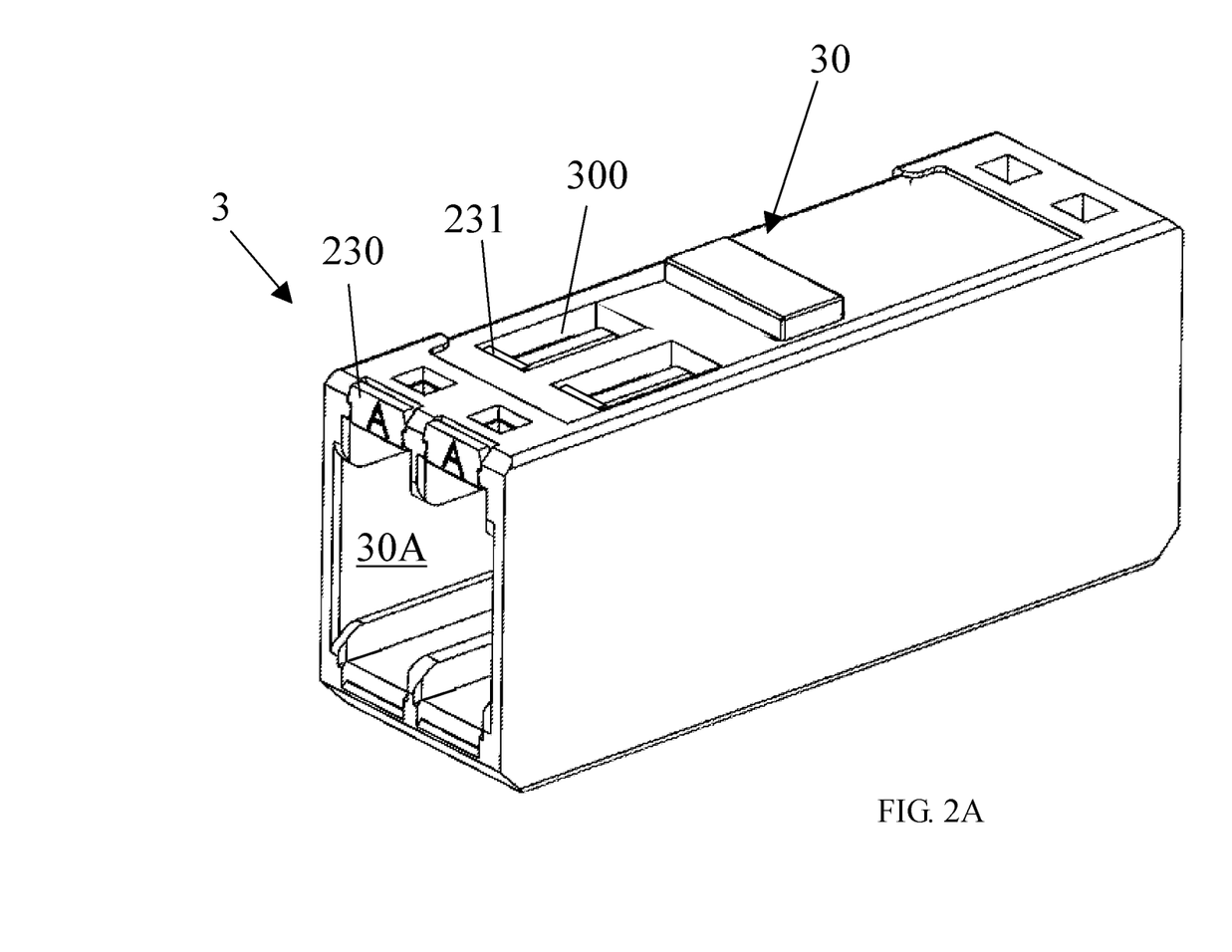
FIG. 2A is a three-dimensional schematic diagram of an optical receptacle in the present invention.
Figure 2B:
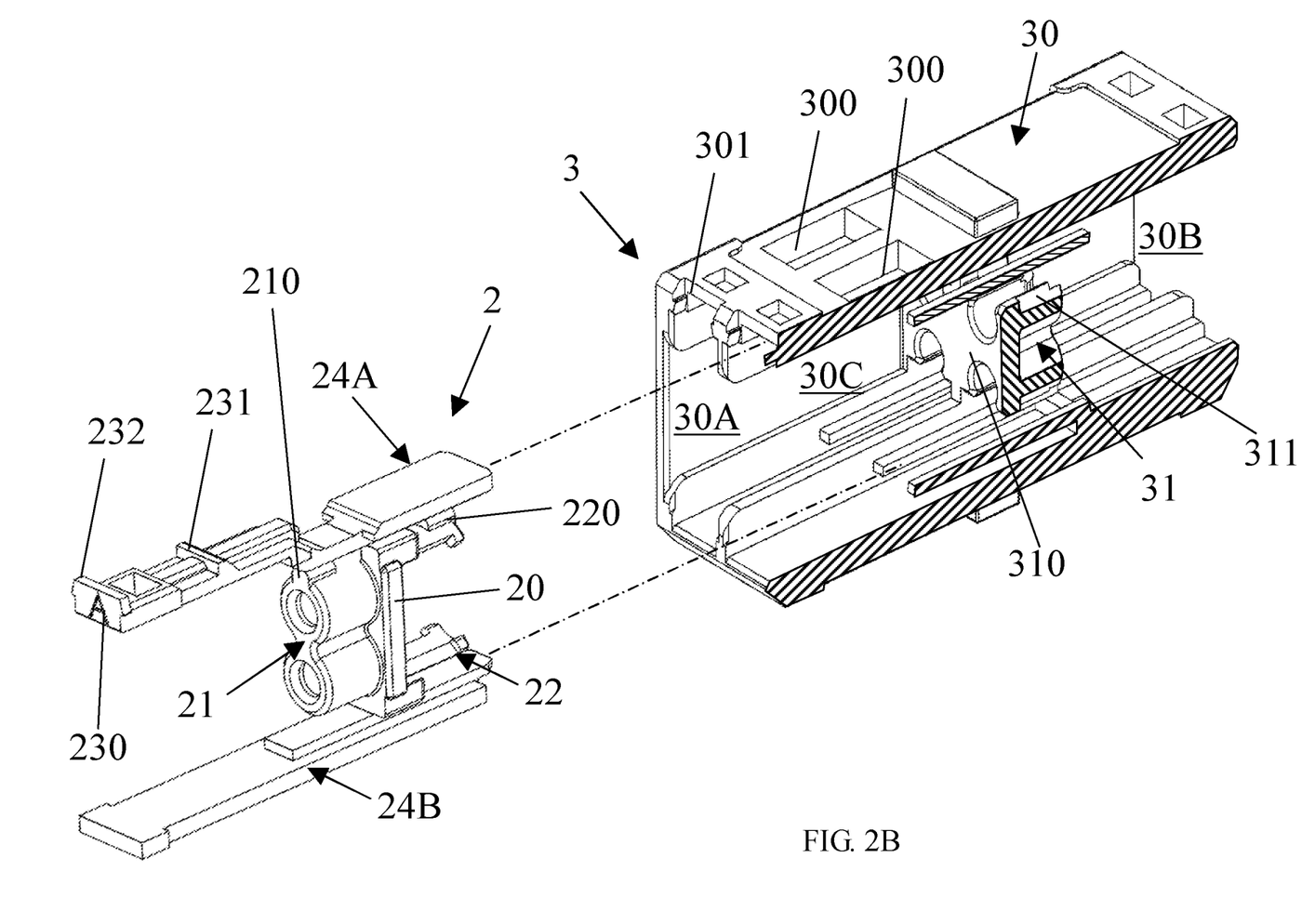
FIG. 2B is a partial exploded cross-sectional schematic diagram of the housing of the optical receptacle in the present invention.
Figure 2C:
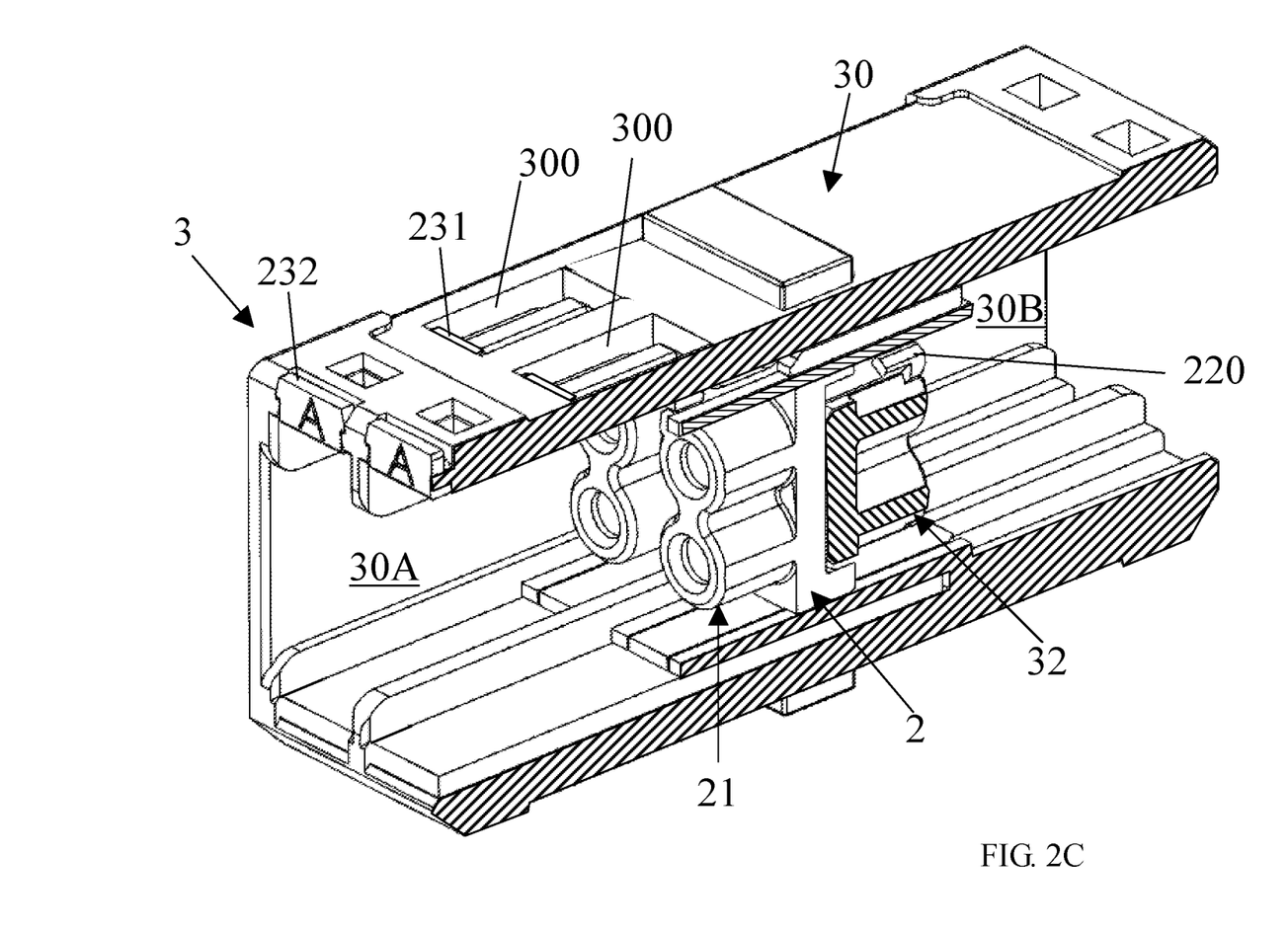
FIG. 2C is a schematic cross-sectional diagram of the optical receptacle in the present invention.

Please refer to FIGS. 2A to 2C, in which FIG. 2A is a three-dimensional schematic diagram of an optical receptacle, FIG. 2B is a partial exploded cross-sectional schematic diagram of the housing of the optical receptacle, and FIG. 2C is a schematic cross-sectional diagram of the optical receptacle. The optical receptacle 3 includes a housing 30 with a first insertion hole 30A and a second insertion hole 30B on both sides, respectively. The housing 30 has an accommodation space 30C and at least one first assembly structure 31. In this embodiment, the first assembly structure 31 is integrally formed with the housing 30 and has a leaning surface 310 and a plurality of assembly members 311. It should be noted that the latch structure 2 is inserted into the accommodation space 30C of the housing 30 through the first insertion hole 30A, wherein the first assembly member 22A and the second assembly member 22B of the latch structure 2 are respectively connected to the corresponding assembly members 311 of the first assembly structure 31, and the surface of the supporting element 20 of the latch structure 2 and the leaning surface 310 are leaned against each other. After the first assembly member 22A and the second assembly member 22B are combined with the first assembly structure 31, at the second insertion hole 30B, the first assembly member 22A and the second assembly member 22B are combined with the corresponding coupling members 311 to form a second coupling structure 32, which is used for coupling with the optical connector inserted through the second insertion hole 30B, and the first coupling structure 21 is used for coupling with the optical connector inserted through the first insertion hole 30A.

The housing 30 has a first buckle groove 300, and the extending arm 23 has the first fastener 231 at a position corresponding to the first buckle groove 300. When the latch structure 2 is installed in the housing 30, the first fastener 231 is used to be embedded into the first buckle groove 300. In addition, the housing 30 has a second buckle groove 301, and the extending arm 23 has the second fastener 232 at a position corresponding to the second buckle groove 301. When the latch structure 2 is installed in the housing 30, the second fastener 232 is embedded into the second buckle groove 301. There is an identification structure 230 on the surface of the second fastener 232.

Figure 3A:
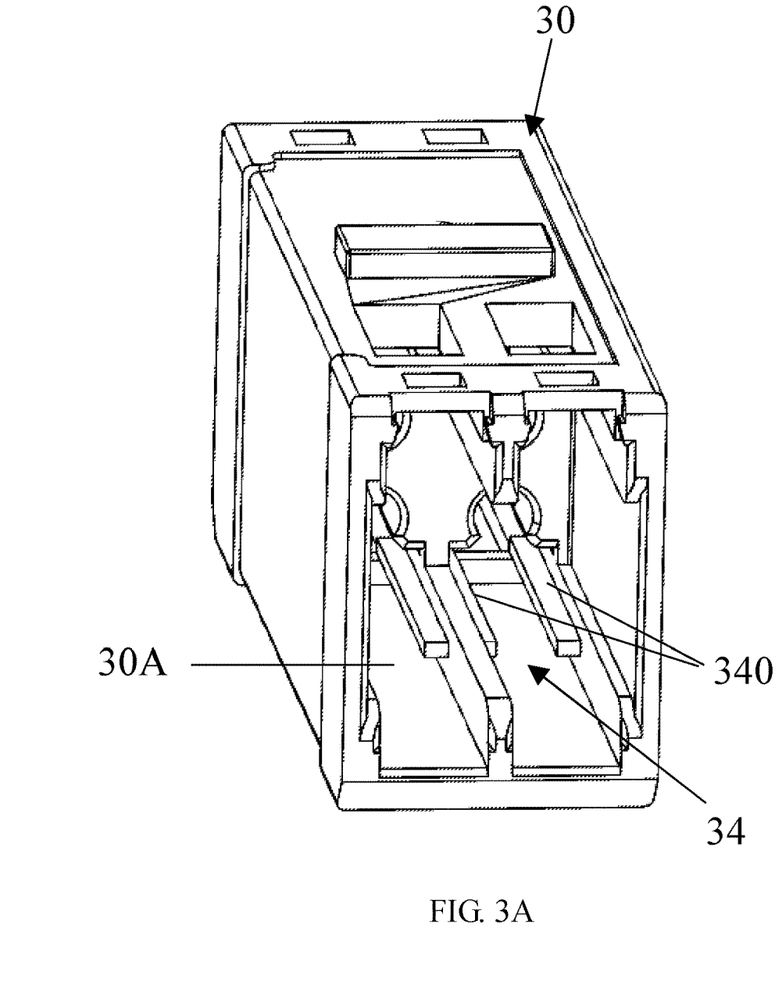
FIG. 3A is a schematic diagram of a viewing angle from the first insertion hole of the housing in the present invention.
Figure 3B:
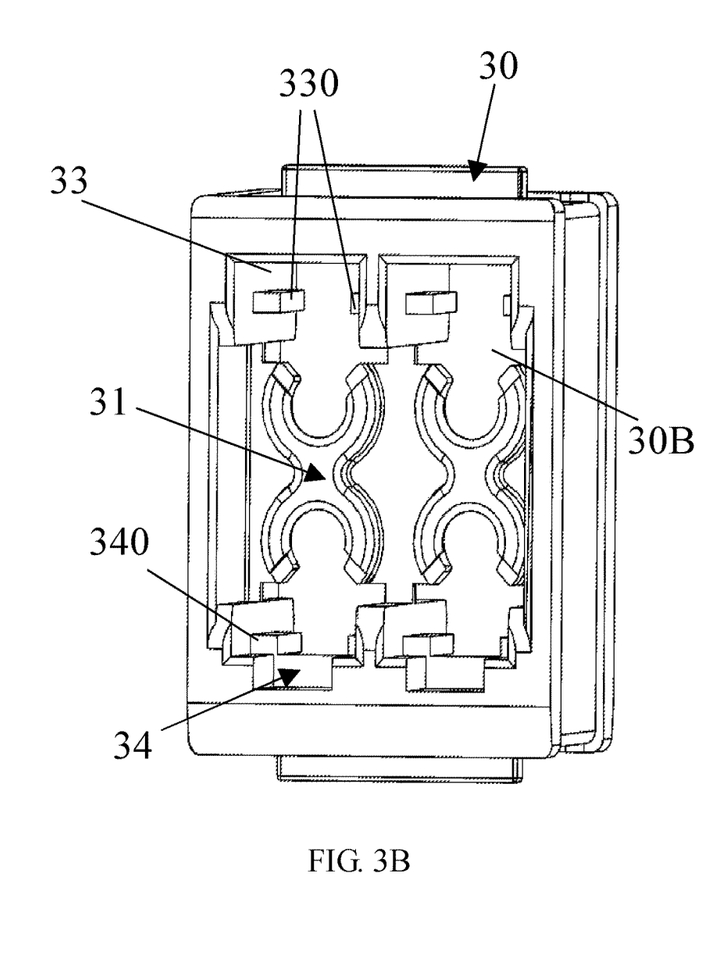
FIG. 3B is a schematic diagram of a viewing angle from the second insertion hole of the housing in the present invention.

Please refer to FIGS. 3A and 3B, in which FIG. 3A is a schematic diagram of a viewing angle from the first insertion hole of the housing in the present invention, and FIG. 3B is a schematic diagram of a viewing angle from the second insertion hole of the housing in the present invention. In this embodiment, referring to FIGS. 2B and 3A to 3B at the same time, there is a first guiding groove 33 above each first assembly structure 31 of the second insertion hole 30B, and the first guiding groove 33 is formed by two first protruding blocks 330 and a top surface inside the housing 30. When the latch structure 2 is inserted into the housing 30, the first guiding plate 24A is embedded into the first guiding groove 33, and the first guiding body 240 on the first guiding plate 24A is embedded into a space between the two first protruding blocks 330 to achieve an engaging effect. Similarly, at the first insertion hole 30A, there is a second guiding groove 34 corresponding to the bottom of each first assembly structure 31, which is formed by two second protruding blocks 340 and the bottom surface of the housing 30. When the latch structure 2 is inserted into the housing 30, the second guiding plate 24B is embedded into the second guiding groove 34, and the second guiding body 241 on the second guiding plate 24B is embedded into a space between the two second protruding blocks 340 to achieve an engaging effect.

Figure 4A:
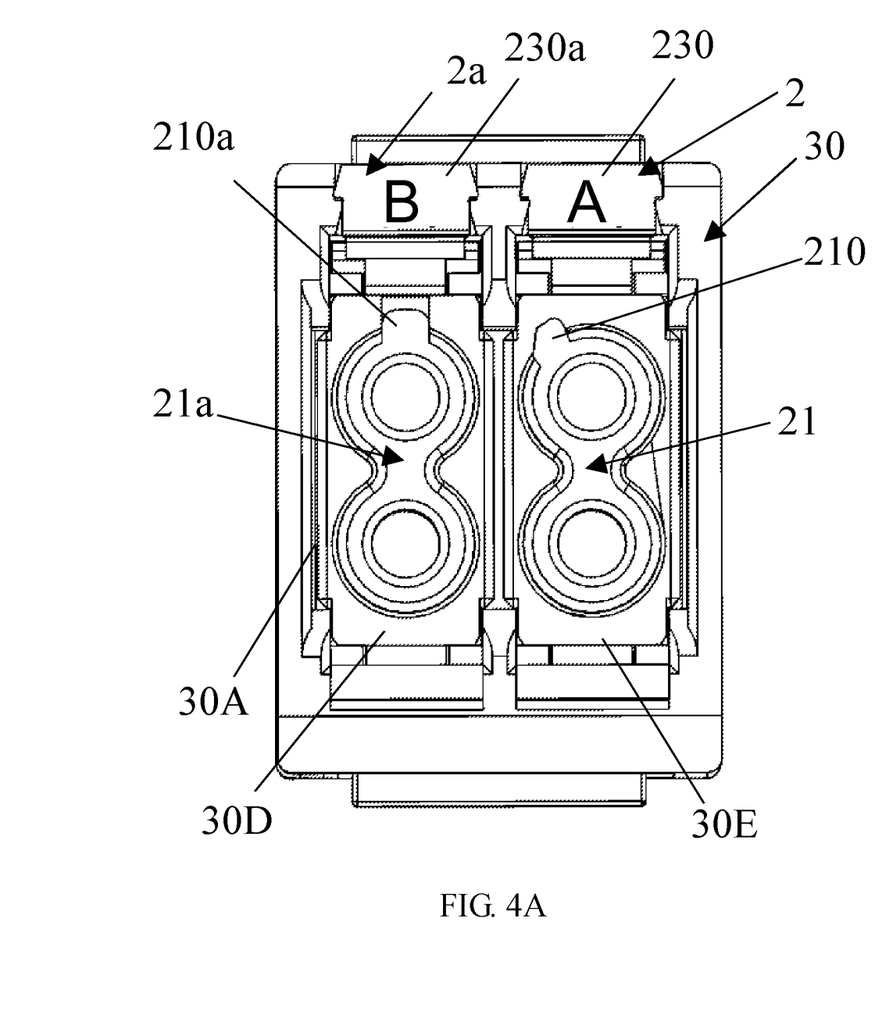
FIG. 4A is a schematic diagram of the optical receptacle with different latch structures in the present invention.
Figure 4B:
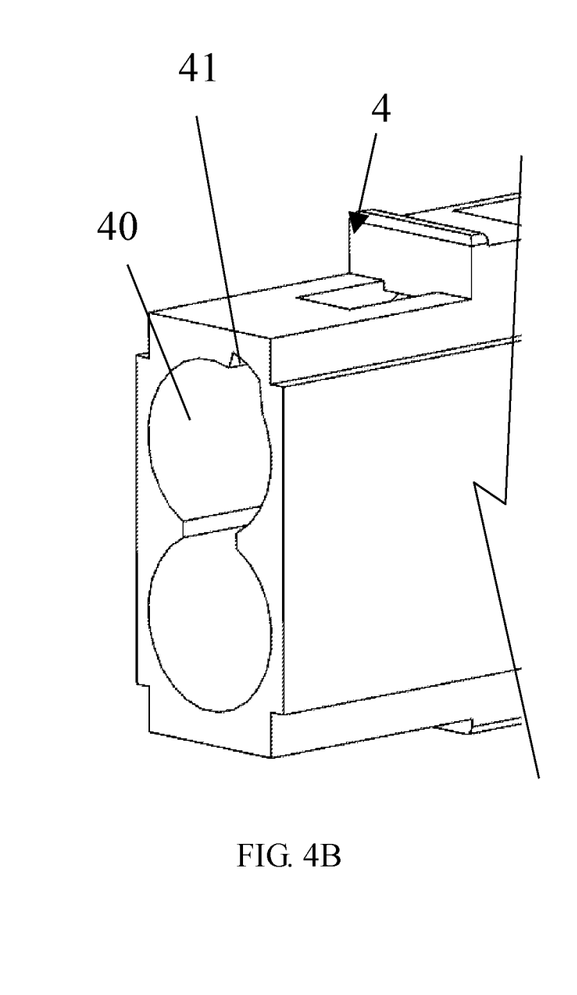
FIG. 4B is a schematic diagram of the optical connector matching with the latch structure of the optical receptacle in the present invention.

Next, the operation mode is going to be explained. Please refer to FIGS. 4A and 4B, in which FIG. 4A is a schematic diagram of the optical receptacle with different latch structures in the present invention, and FIG. 4B is a schematic diagram of the optical connector matching with the latch structure of the optical receptacle in the present invention. The first insertion hole 30A has two insertion slots 30D and 30E. Each insertion slot 30D and 30E is equipped with latch structure 2a and 2, respectively. Each latch structure 2 and 2a has a different identification feature, which is a color. For example, the color of the latch structure 2 and 2a are different, which may be directly understood by the user. The latch structures 2 and 2a further have identification structures 230 and 230a, which may be different texts or patterns. In addition, it may also be seen from FIG. 4A that the first alignment structures 210 and 210a on the adjacent latch structures 2 and 2a are at different positions, so that the first coupling structures 21 and 21a are limited to be inserted by the optical connectors having a corresponding alignment groove (FIG. 4B). For example, the optical connector 4 shown in FIG. 4B has a guiding hole 40 and an alignment groove 41. The alignment groove 41 in this embodiment corresponds to the first alignment structure 210 of the latch structure 2. Therefore, the optical connector 4 may only be inserted into the insertion slot 30E to be combined with the corresponding first coupling structure 21, but may not be inserted into the insertion slot 30D to be combined with the first alignment structure 21a.

It should be noted that although FIG. 4A is illustrated with the first insertion hole 30A, according to the same logical concept, as shown in FIGS. 2B and 2C, the second alignment structure 220 of the adjacent latch structure 2 in the second insertion hole 30B may also have different configuration, which may restrict the insertion by only the optical connector with the corresponding configuration.

In conventional technology, the user or the manufacturer must know the order of the alignment features that cannot be changed in advance, so that each specific optical connector can be correctly inserted into the corresponding receptacle. However, the latch structure of the present invention is designed to be detachable, for example: the latch structure 2 or 2a in FIG. 4A, so that the user may assemble a suitable latch structure into the optical receptacle as needed to solve the problem of the conventional technology. In addition, through visually identification features or structures, such as alignment structure, color or text, the user can install the latch structure into the optical receptacle and the features of the insertion slot can be distinguished through visual recognition. The corresponding optical connector can be quickly and unambiguously selected and inserted into the corresponding optical receptacle, which increases the convenience of use and operation.

It will be understood that the above description of embodiments is given by way of example only and that various modifications may be made by those with ordinary skill in the art. The above specification, examples, and data provide a complete description of the present invention and use of exemplary embodiments of the invention. Although various embodiments of the invention have been described above with a certain degree of particularity, or with reference to one or more individual embodiments, those with ordinary skill in the art could make numerous alterations or modifications to the disclosed embodiments without departing from the spirit or scope of this invention.

What is claimed is:

1. A latch structure, disposed in an optical receptacle, a first assembly structure is fixed into the optical receptacle, comprising:
    a supporting element, having a first side and second side;
    a first coupling structure, located on the second side of the supporting element, and having a first alignment structure; and
    a second assembly structure, disposed on the supporting element and extended toward the first side, the second assembly structure combined with the first assembly structure to form a second coupling structure, and the second assembly structure having a second alignment structure,
    wherein the first alignment structure is disposed on a wall of the first coupling structure,
    wherein an end of the supporting element has an extending arm, which has an identification feature,
    wherein a first fastener is disposed on the extending arm, and an end of the extending arm has a second fastener.

2. The latch structure of claim 1, wherein the identification feature is color.

3. The latch structure of claim 1, wherein the second fastener has an identification structure.

4. The latch structure of claim 3, wherein the identification structure is text or pattern.

5. An optical receptacle, comprising:
    a housing, two sides of the housing respectively having a first insertion hole and a second insertion hole, an accommodation space is disposed in the housing, and at least one first assembly structure is fixed into the housing; and
    at least one latch structure, disposed in an optical receptacle, the each latch structure comprising:
        a supporting element;
        a first coupling structure, extended toward the second insertion hole from the supporting element, and the first coupling structure having a first alignment structure and configured for coupling to a first optical connector inserted through the second insertion hole; and
        a second assembly structure, disposed on the supporting element and extended toward the first insertion hole, the second assembly structure having a second alignment structure, and the second assembly structure combined with the first assembly structure to form a second coupling structure, which is configured for coupling to a second optical connector inserted through the first insertion hole,
    wherein the first alignment structure is disposed on a wall of the first coupling structure,
    wherein an end of the supporting element has an extending arm, which has an identification feature,
    wherein the housing has a first buckle groove, the extending arm has a first fastener corresponding to the first buckle groove and is configured for embedding into the first buckle groove,
    wherein the housing has a second buckle groove, the extending arm has a second fastener corresponding to the second buckle groove and is configured for embedding into the second buckle groove.

6. The optical receptacle of claim 5, wherein the identification feature is color.

7. The optical receptacle of claim 5, wherein the identification structure is text or pattern.

8. The optical receptacle of claim 5, wherein the number of the at least one latch structure is plural, positions of setting the first alignment structure on the each first coupling structure are different, and positions of setting the second alignment structure on the each second coupling structure are different.

* * * * *